United States Patent [19]

Fusaro et al.

[11] Patent Number: 4,804,066

[45] Date of Patent: Feb. 14, 1989

[54] DEVICE FOR THE ELEVATED POSITIONING OF AUTOMOBILES

[76] Inventors: Angelo Fusaro, Via Roma 72; Giancarlo Galeazzi, Via Bozzolo 57, both of Volta Mantovana (Prov. of Mantova), Italy

[21] Appl. No.: 47,087

[22] Filed: May 8, 1987

[30] Foreign Application Priority Data

Dec. 15, 1986 [IT] Italy .............................. 18125 A/86

[51] Int. Cl.[4] ................................................ B60J 13/00

[52] U.S. Cl. .................................... 187/8.71; 414/229; 254/5 C

[58] Field of Search ..................... 187/8.41, 8.71, 8.77, 187/8.65, 9 R; 254/2 A, 2 B, 2 C, 3 R, 3 C, 5 R, 5 C; 414/229, 230, 253, 254

[56] References Cited

U.S. PATENT DOCUMENTS 3,387,722 6/1968 Fisher, Sr. et al. ................ 187/8.71
4,316,527 2/1982 Klaus et al. ......................... 187/8.71

*Primary Examiner*—Joseph J. Rolla
*Assistant Examiner*—Kenneth Noland
*Attorney, Agent, or Firm*—Guido Modiano; Albert Josif

[57] ABSTRACT

The device comprises a supporting platform for at least one automobile, with sides each provided with a pair of wheels connected to variable-geometry supports. The supports are adapted for contact engagement, during the motion of the platform, with guides provided on the vertical elements of a supporting structure and configured so as to offer a sloping portion proximate to the base and a substantially vertical portion.

6 Claims, 2 Drawing Sheets

DEVICE FOR THE ELEVATED POSITIONING OF AUTOMOBILES

BACKGROUND OF THE INVENTION

The present invention relates to a device for the elevated positioning of automobiles.

It is known that the need to increase the capacity of garages suitable for containing automobiles has brought about the appearance on the market of devices which provide the lifting of at least one automobile, freeing a portion of the underlying area in which at least a second automobile can be accommodated.

The known devices have different constructive structures, all of which, however, are not free from some disadvantageous characteristics, the most important of which resides in the fact that they do not allow the arrangement of the automobiles in the garages in the most rational manner.

Another disadvantageous characteristic resides in the fact that said known devices have a certain constructive complexity, with difficulty in assembly and a rather high cost.

SUMMARY OF THE INVENTION

The aim proposed by the present invention is to provide a device which allows the elevate positioning of at least one automobile with a high degree of optimization in the use of the available room, no matter what the type of automobile to be handled may be.

Within the scope of this aim, an object of the invention is to provide a device having great simplicity in construction, so as to allow the easy assembly thereof and the possibility of manufacturing the device with low costs.

The aim proposed, as well as the object mentioned, are achieved by a device for the elevated positioning of automotive vehicles, according to the invention, characterized in that it comprises a base frame which is anchored on the floor of the parking room and included two lateral substantially vertical and parallel side mats, guide means extending along said mats substantially longitudinally thereof, a vehicle supporting platform having a front entry for vehicles and an opposite rear end, said platform being mounted on said base frame inwardly of said mats and extending in a rest position substantially parallel to said floor at least one pair of superposed rollers rotatably mounted on each side of said platform proximate said rear end portion therof said rollers being arranged for being slidingly received by said guide means to thereby maintain said platform substantially parallel to itself during elevation thereof, a pair of lever arms having one end thereof fixedly pivoted to said respective vertical mats and the other end thereof connected to said platform substantially centrally thereof for supporting said platform, means operatively connected to said lever arms for actuating pivoting thereof to thereby cause raising of said transverse crossbar and hoisting of said platform from a lower rest position to an upper operative position, the improvement in which said substantially vertical guide means have bottom end portions which are sloped with respect to the remainder vertical portions thereof such that said platform is caused to tilt during raising thereof by passage of said pairs of rollers from said sloped to said vertical portions of said guide means, and wherein the rollers of each pair are mounted on a respective supporting means connected to said platform laterally thereof, said supporting means including at least one fixed and one removable portion reciprocally connectible in selected positions by removable coupling means for connecting said fixed and said removable portions to thereby permit repositioning of said rollers with respect to said platform, whereby tilting of said platform is selectively adjustable for optimum fitting thereof to the available parking space.

BRIEF DESCRIPTION OF THE DRAWINGS

Further characteristics and advantages will become apparent from the description of a preferred, but not exclusive, embodiment of the invention, illustrated only by way of non-limitative example in the accompanying drawings, wherein.

DESCRIPTION OF THE PREFERRED EMBODIMENTS

Figure 1:
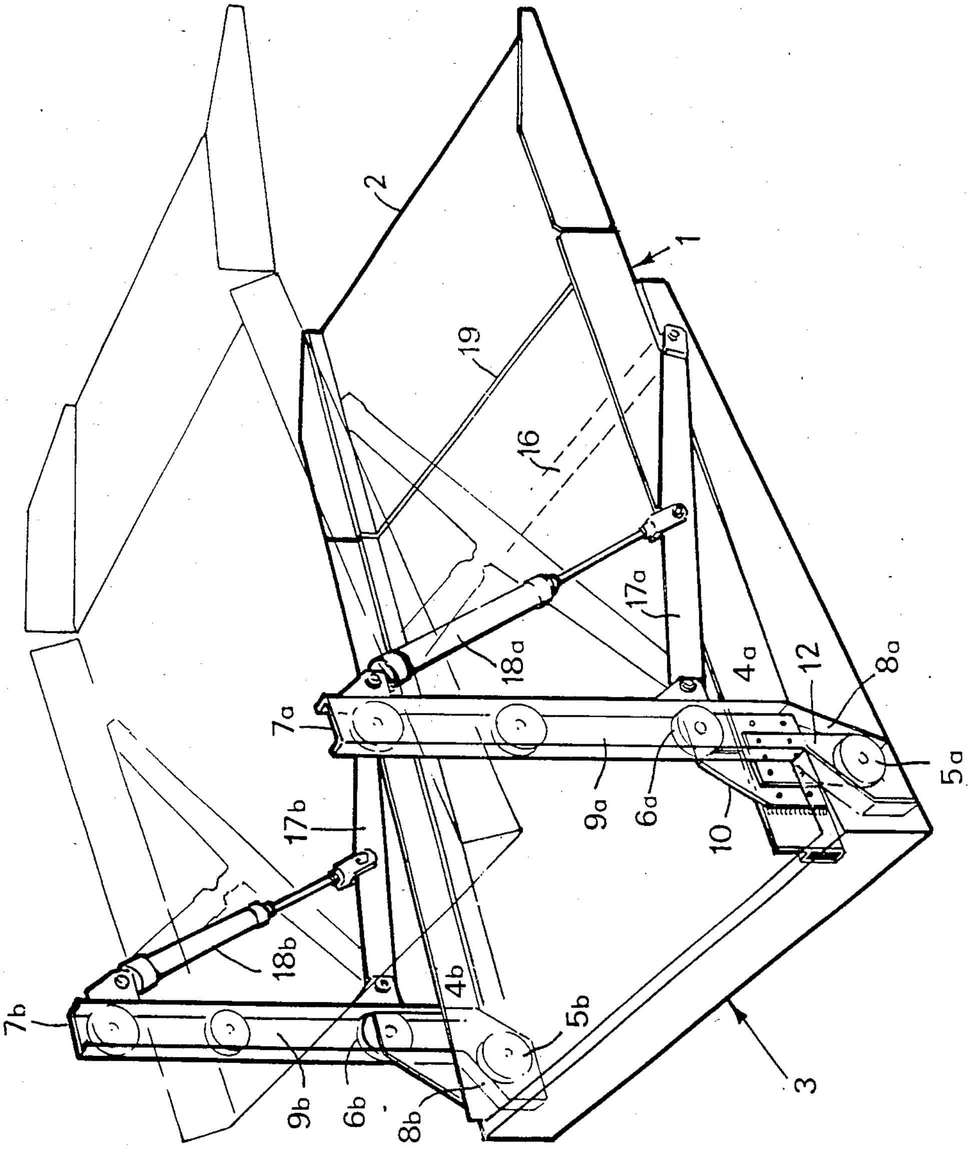
FIG. 1 is a perspective view of the invention with the platform, at the lower end of its motion, indicated in heavy lines, and said platform at the upper end of its motion indicated in thin lines.

With reference to the above described figures, the reference numeral 1 indicates the supporting platform for the wheels of at least one automobile in the position at the lower end of its motion, with the front edge 2 for the entry of vehicles resting on the floor of a garage to allow the elevation of an automobile, and the supporting structure of the device, generally indicated with the reference numeral 3, also rests on said floor.

The platform 1 comprises the sides **4*a* and 4*b* fitted, proximate thereof remote from the entry end, with a pair of rollers freely connected to supports which will be described hereinafter, and the rollers connected to the side 4*a* are indicated by the reference numerals 5*a* and 6*a*, and the rollers connected to the side 4*b* are indicated by the numerals 5*b* and 6*b***.

Said rollers are intended to keep, during the motion of the platform 1 from the lower stroke limit position, indicated in heavy lines, to the upper stroke limit position, indicated in thin lines, inside guides provided within the vertical elements **7*a*, 7*b* of the supporting structure. Said guides have a sloping portion 8*a*, 8*b* proximate to the base resting on the floor and a portion 9*a*, 9*b*** which is substantially vertical.

This configuration of the guides allows the position of the platform to be maintained constant in the upper part of the motion, with the inclination which is most suitable for allowing the accommodation in the available room of the garage of an automobile resting on the platform itself and of an automobile resting on the floor below the platform, and to change only in the lower final part of the motion, with a downward inclination of the front edge 2 in order to allow the resting of said edge on the floor, to permit the passage of an automobile.

The attitude of the platform in the upper part of the motion, with the inclination most suitable for allowing the accommodation of automobiles, is allows by selecting the configuration of the supports of the rollers **5*a*, 6*a*** and 5*b*, 6*b*, which are now described with reference to those of the wheels 5*a*, 6*a*, it being understood that those of the wheels 5*b*, 6*b* have an identical configuration.

Said supports thus comprise the plate 10 fixed, for example, by welding to the side 4*a*, from which the free supporting pin 11 of the wheel 6*a* extends, and the plate 12, from which the free supporting pin 13 of the rollers 5*a* extends, which is adapted for being removably fixed to the plate 10 in an adjustable position according to the selection of the holes provided in the two plates which it is decided to arrange facing each other so as to have locking bolts or the like elements pass through them.

Figure 3:
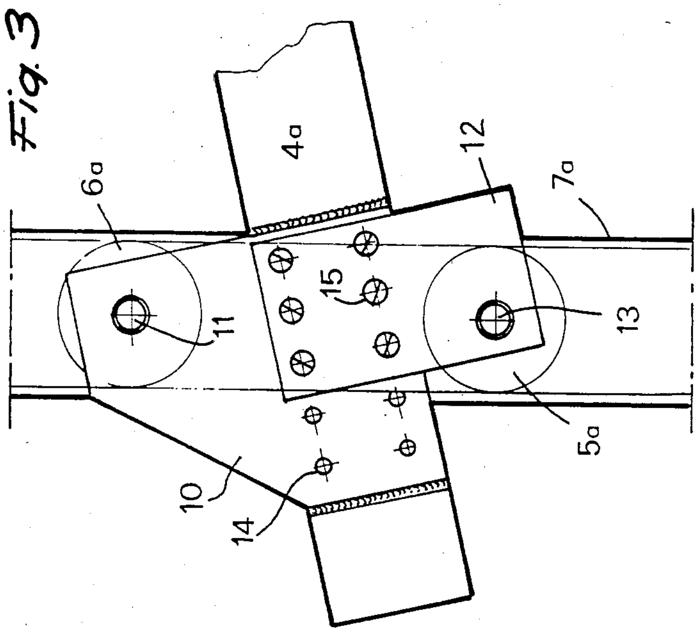
FIG. 3 is a view of the detail of the supports of the preceding figure, according to still another configuration.
Figure 2:
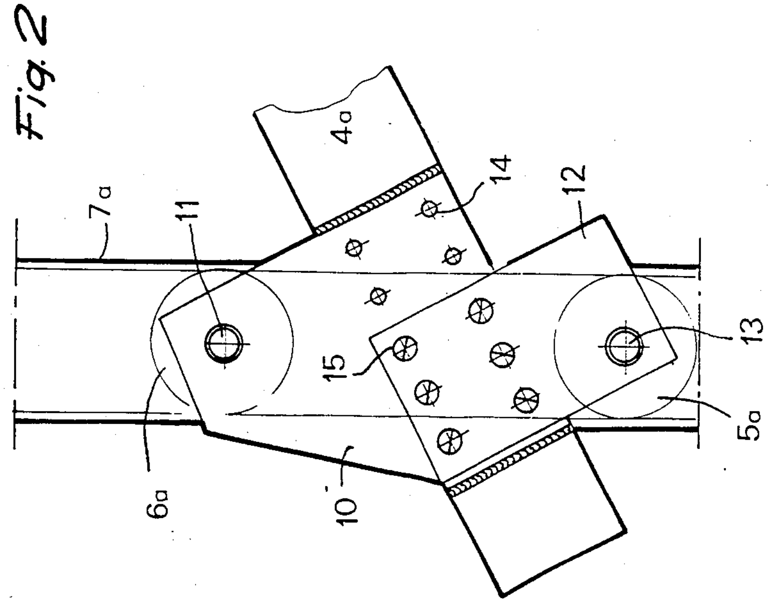
FIG. 2 is a view of the detail of the variable-geometry supports of a pair of rollers of the platform, in one of the possible configurations, different from the one illustrated in FIG. 1.

FIGS. 1, 2, 3 indicate three different possibilities offered by the number of holes provided in the plates of the device illustrated, and precisely two rows of five holes 14 in the plate 10, and two rows of three holes for the passage of six bolts 15 in the plate 12.

In FIG. 2 the holes of the plate 12 face the rearmost holes of the plate 10, and thus, as can be immediately understood by examining the illustration, the attitude of the platform will be obtained with the maximum upward inclination of the front edge, while the attitude of the platform with the minimum inclination will be achieved by facing the holes of the plate 12 to the frontmost holes of the plate 10, as illustrated in FIG. 3; an intermediate situation is the one illustrated in FIG. 1, wherein the platform 1 is parallel to the floor of the garage.

As can be seen, there is a wide choice, and the installer may decide one each occasion, according to the vehicles to be accommodated and the room available, which configuration to assign to the device in order to optimize its performance.

The motion of the platform 1 is provided by means which comprise the crosspiece 16 in rolling contact with its lower face, connected to one end of the arms 17*a*, 17*b* which are pivoted at the other end on the vertical elements of the supporting structure, and are operated by power assisted means such as operating hydraulic or pneumatic cylinders 18*a*, 18*b*; naturally, a conventional mechanical safety device is present, not illustrated in the figures, which ensures against the undesired lowering of the platform.

Finally, the reference numeral 19 indicates a joint in the platform 1, arranged for the entry of the vehicles thereon.

The invention thus described is susceptible to numerous modifications and variations, all of which are within the scope of the inventive concept; thus, as an example, the plate 10, instead of being welded to the side, may be made rigidly coupled thereto by means which allow its longitudinally adjustable fixing.

In the practical embodiment of the invention, all the details may be replaced by other technically equivalent elements; moreover, the materials employed, as well as the dimensions and the shapes, may be any according to requirements.

We claim:

1. In a device for elevating vehicles in a parking room, comprising a base frame which is anchored on the floor of the parking room and included two lateral substantially vertical and parallel side mats, guide means extending along said mats substantially longitudinally thereof, a vehicle supporting platform having a front entry for vehicles and an opposite rear end, said platform being mounted on said base frame inwardly of said mats and extending in a rest position substantially parallel to said floor at least one pair of superposed rollers rotatably mounted on each side of said platform proximate said rear end portion thereof said rollers being arranged for being slidingly received by said guide means to thereby maintain said platform substantially parallel to itself during elevation thereof, a pair of lever arms having one end thereof fixedly pivoted to said respective vertical mats and the other end thereof connected to said platform substantially centrally thereof for supporting said platform, means operatively connected to said lever arms for actuating pivoting thereof to thereby cause raising of a transverse crossbar and hoisting of said platform from a lower rest position to an upper operative position, the improvement in which said substantially vertical guide means have bottom end portions which are sloped with respect to the remainder vertical portions thereof such that said platform is caused to tilt during raising thereof by passage of said pairs of rollers from said sloped to said vertical portions of said guide means, and wherein the rollers of each pair are mounted on a respective supporting means connected to said platform laterally thereof, said supporting means including at least one fixed and one removable portion reciprocally connectible in selected positions by removable coupling means for connecting said fixed and said removable portions to thereby permit repositioning of said rollers with respect to said platform, whereby tilting of said platform is selectively adjustable for optimum fitting thereof to the available parking space.

2. Device according to claim 1, wherein said fixed portion of said supporting means comprises a first supporting plate rigidly connected to said platform and carrying a first bearing pin for one first roller of a respective pair, said first supporting plate being further provided with a first plurality of holes for the passage of said removable coupling means.

3. Device according to claim 2, wherein said removable portion of said supporting means comprises a second supporting plate carrying a second pin for one second roller of a respective pair and is further provided with a second plurality of holes for the passage of said removable coupling means, said second plurality of holes being selectively registrable with at least part of said first plurality of holes to provide a common passage therethrough for said removable coupling means.

4. Device according to claim 3, wherein said coupling means consist of locking bolts.

5. Device according to claim 1, wherein said transverse crosspiece includes a rolling bar extending substantially parallel to said platform transversly of the longitudinal direction thereof and arranged for rolling contact engagement with the bottom surface of said platform.

6. Device according to claim 1, wherein said actuating means comprise hydraulically operated cylinders.

* * * * *